UNITED STATES PATENT OFFICE.

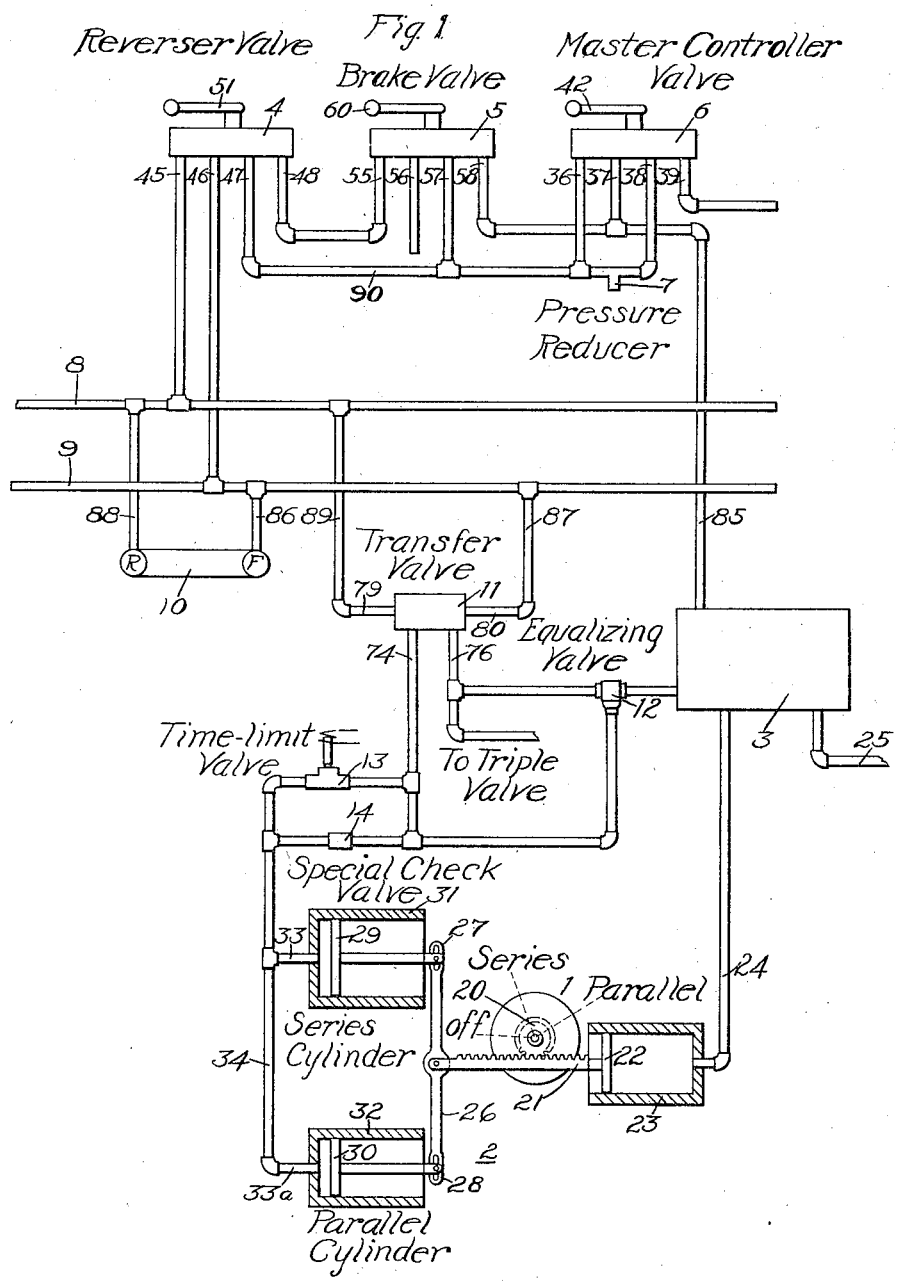

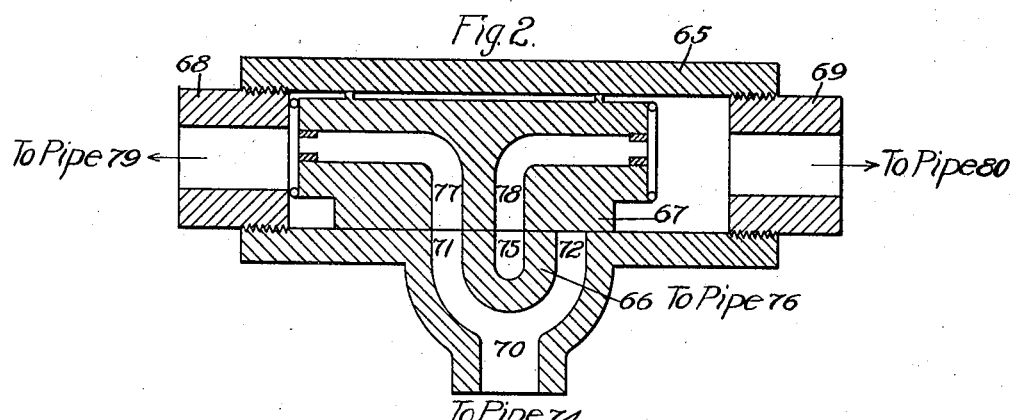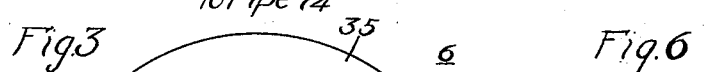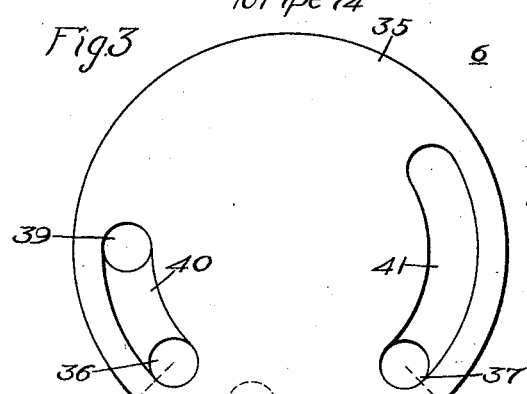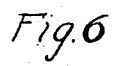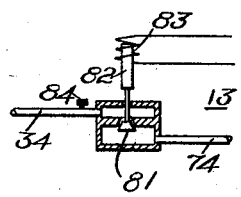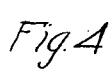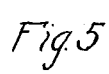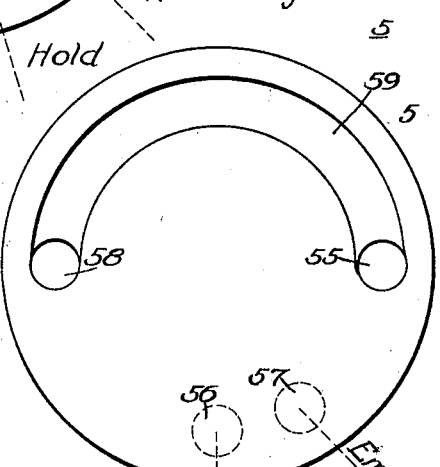

BASCUM O. AUSTIN, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM AND APPARATUS.

1,374,545.  Specification of Letters Patent.  Patented Apr. 12, 1921.

Application filed October 11, 1919. Serial No. 330,122.

*To all whom it may concern:*

Be it known that I, BASCUM O. AUSTIN, a citizen of the United States and a resident of Wilkinsburg, in the county of Allegheny and State of Pennsylvania, have invented a new and useful Improvement in Control Systems and Apparatus, of which the following is a specification.

My invention relates to control systems and apparatus and it has special relation to pneumatic control systems for governing electric railway motors and the like.

One object of my invention is to provide a control system of the above-indicated character wherein various control functions, as well as braking of the vehicle, may be pneumatically effected in a simple manner requiring the use of a minimum number of train-line pipes.

Another object of my invention is to provide various automatic safety features in a system of the class under consideration whereby, for example, the vehicle brakes are set and the electric circuits are opened upon a rupture of a train-line pipe.

Another object of my invention is to provide a pneumatic control system which may be reliably applied to a relatively large number of multiple-unit cars.

A further object of my invention is to provide a novel type of pneumatic actuating mechanism for a drum controller or the like.

Still another object of my invention is to provide means for normally governing the acceleration of the vehicle in accordance with the current traversing the driving motors, together with coacting time-control means for effecting further acceleration in case such automatic means is temporarily rendered inoperative.

Other objects of my invention relating to the structure of the apparatus or the principles of operation thereof will become evident from the following detailed description taken in conjunction with the accompanying drawings, wherein—

Figure 1 is a diagrammatic view, partially in section, of a pneumatic control system organized in accordance with the present invention;

Fig. 2 is an enlarged sectional view of a transfer valve that is employed in the system shown in Fig. 1;

Fig. 3, Fig. 4 and Fig. 5 are detail views of parts of the controlling valves illustrated in Fig. 1; and Fig. 6 is a detail sectional view of the current-controlled or time-limit valve that is employed in that system.

Referring to Fig. 1, the system here shown comprises a drum controller 1, or the like, for governing a plurality of vehicle-driving motors; an actuating mechanism 2 for the drum 1; a source of fluid-pressure, such as a reservoir 3; and a plurality of primary governing means 4, 5 and 6, respectively designated as reverser valve, brake valve and master controller valve. In addition, a pressure reducer 7 is employed for a purpose to be set forth, and a plurality of train-line pipes 8 and 9 are employed to govern the operation of the actuating mechanism 2, as well as a pneumatic reverser 10 and a transfer valve 11. A time-limit valve 13 is governed by a motor-operating current and is by-passed by a special check valve 14, these two valves being employed for controlling the operation of the actuating mechanism 2.

It will be understood that my pneumatic control system may be applied to any series-parallel control system that employs a drum controller, cam switches or the like, and, since the particular type of such electric control system is not relevant to the present invention, I have not deemed it necessary to illustrate or describe any such system. The drum controller 1 is adapted to control the vehicle-driving motors and is provided with three main positions, respectively marked "Off", "Series" and "Parallel", corresponding to disconnection, series connection and parallel connection of the driving motors.

The actuating mechanism 2 comprises a pinion 20 that is secured to the operating shaft of the drum 1 to mesh with a rack member 21, one end of which constitutes a piston 22 traveling within a suitable cylinder 23, which is connected through a pipe 24 directly to the control reservoir 3. This reservoir may be fed from the usual air-compressor system through a supply pipe 25, as will be understood.

The rack member 21 has its free end pivotally secured to the central portion of a lever arm 26, the opposite ends 27 and 28 of which have suitable lost-motion connections with a plurality of piston members 29 and 30 that travel within operating cylinders 31 and 32 and that respectively correspond to series and to parallel operation of the driving motors, as indicated by the accompanying legends. The cylinders 31 and 32 are connected by pipes 33 and 33ª to a common supply pipe 34.

The master controller valve 6 comprises a suitable incasing member for a rotatable valve seat 35 (Fig. 3) with which a plurality of pipes or passages 36, 37, 38 and 39 are adapted to communicate in the various positions of the valve, which positions determine the locations of a plurality of slots or passages 40 and 41 in the valve seat 35. The master controller valve is illustrated in Fig. 3 as occupying its "off" position, wherein the supply pipe 37 registers with one end of the passage 41, while the other passage 40 serves to connect the pipes 36 and 39, the latter pipe being connected to exhaust directly to the atmosphere. In addition to the "off" position of the master controller valve, positions "Hold", "Series" and "Parallel" are provided, which terms are self-explanatory. A suitable operating handle 42 for the master controller valve is provided.

The reverser valve 4 comprises a rotatable valve seat 44 (Fig. 4) with which a plurality of pipes or pasages 45, 46, 47 and 48 communicate. The reverser valve is adapted to occupy an "off", a "forward" and a "reverse" position and is illustrated in Fig. 4 as occupying its "forward" position, wherein pipes 46 and 48 are placed in communication by a slot or passage 49 and the pipes 45 and 47 are connected by a slot or passage 50. In the "reverse" position, the valve 4 is adapted to interconnect pipes 46 and 47 and also pipes 45 and 48, while in the "off" position, no pipe is in communication with another. A suitable operating handle or lever 51 for the reverser valve is provided.

The brake valve 5 comprises a rotatable valve seat 54 (Fig. 5) with which a plurality of pipes or passages 55, 56, 57 and 58 communicate. A suitable operating handle 60 for the valve is provided. A slot or passage 59 normally connects the pipes 55 and 58, that is, when the valve occupies its illustrated "release" position, while the positions corresponding to the interconnection of supply pipe 58 with the pipe 56 and the pipe 57 respectively correspond to service and emergency brake application, as indicated by the accompanying legends.

The various functions of the primary controlling valves 4, 5 and 6 will become clear from the subsequent detailed description of the system operation.

The pressure-reducing device 7 may be of any well-known form for decreasing the normal reservoir pressure present in the pipe 38 to a predetermined lower value for actuating the piston 29 of the series cylinder, as subsequently more fully set forth.

The reverser 10 is of a familiar electrically-controlled, pneumatically-actuated type and may be electrically interlocked with the control drum 1 or a supply-circuit-connecting switch, in accordance with a familiar prior practice, to prevent false operation of circuits.

The transfer valve 11 controls both the actuating mechanism 2 and the piping system leading to the well-known triple valve (not shown), in accordance with the particular pipe 8 or 9 that is employed as a control pipe or, in other words, in accordance with the direction of motion of the vehicle, as determined by the reverser valve 4.

As shown in Fig. 2, the transfer valve comprises a cylindrical casing 65 having, on one side, a chambered section 66. A valve seat 67 is adapted to slide within the casing 65, the outer ends of which are respectively fitted with nipples 68 and 69, or the like, with which supply pipes 79 and 80 communicate, as indicated by the legends in Fig. 2. An opening 70 in the chambered section 76 is connected to pipe 74 and divides into two branches 71 and 72. A passage 75, intermediate the branches 71 and 72, communicates with a pipe 76 leading to the triple valve. A pair of passages 77 and 78 in the slidable valve seat 67 are adapted to register with the passages 71 and 75 in the illustrated left-hand position of the valve seat and with the passages 75 and 72 in the other position thereof, to effect the transfer of pneumatic communication that is desired.

The operation of the transfer valve may be set forth as follows. Whenever the main reverser 10 is actuated to either its "forward" or its "reverse" position, the transfer valve seat 67 likewise shifts to its other position. It will be understood that the usual means are provided for preventing the actuation of the reverser unless the motor circuits are open and a predetermined satisfactory degree of air-pressure obtains in the system. Throwing the reverser valve handle 51 in the one or the other direction will cause "brake-release" pressure in the corresponding train-line pipe 8 or 9. If the reverser valve handle is thrown in the forward direction, for example, train-line pipe 9 becomes the "brake" pipe, so that air is admitted through pipes 87 and 80 to the transfer valve 11, thus actuating the valve seat 67 to the illustrated left-hand position unless such position is already occupied. In this way, the "brake-release" pressure is transmitted to the triple valve which then operates in a familiar manner to effect the release of the vehicle air brakes. If control air is then admitted to the other train-line pipe 8, pressure is transmitted through pipes 89 and 79 to passages 77, 71 and 70 in the transfer valve and thence to pipe 74 for governing the operation of the drum controller 1.

When the reverser valve handle 51 is thrown in the opposite direction, the valve seat 67 of the transfer valve likewise shifts its position to connect pipe 80 with pipe 74 and to connect pipe 79 with passage 75 or, in other words, the controlling and brake-release functions of the train-line pipes 8 and 9 are reversed, and the transfer valve is accordingly actuated to effect the proper organization of the pneumatic system for governing the drum controller and the air-brakes.

The equalizing valve 12 may be of any well-known construction for permitting the control reservoirs throughout the several cars of the train to equalize their pressures so that the same pneumatic force may be present in all the actuating mechanisms 2, whereby synchronous notching or step-by-step operation of the various drum controllers, or the like, is insured.

The time-limit valve 13 is diagrammatically shown in Fig. 6 as comprising a valve member 81 for opening and closing the pipe in which it is inserted and which is actuated by means of a magnetizable core 82 and an actuating coil 83 that is connected to be energized in accordance with the current traversing the driving motors, as is customary practice at present in connection with the well-known limit switch or current relay. The time-limit valve is allowed to close the pipe with which it is associated under high-current conditions and open the pipe under low-current conditions to permit the application of fluid-pressure to the actuating mechanism 2, which is thereby caused to take another control step. The operation of the actuating mechanism 2 is thus dependent upon the current traversing the driving motors or, in other words, the acceleration of the motors is under automatic control. In order to satisfactorily meet various operating requirements, the time-limit valve 13 should be provided with the familiar adjustable exhaust port or bleeding valve 84, whereby the rate of leakage through the valve and, consequently, the period of operation of the actuating mechanism 2, may be regulated as desired.

However, to insure that the acceleration of the motors, as determined by the operation of the drum controller 1, is effected within a predetermined period of time and, also, to effect continuance of control operations if the time-limit valve sticks in its upper position for any reason, I provide the special check valve 14 for by-passing the time-limit valve 13. The check valve 14 is provided with an exhaust or leakage port, the active size of which may be varied in any well-known manner to correspondingly adjust the rate of movement of the actuating mechanism 2 and, therefore, the time of acceleration of the driving motors. However, the main function of the check valve is to exhaust fluid pressure in the opposite direction, as subsequently described in detail.

Assuming that it is desired to effect forward operation of the vehicle and that the main reverser 10 initially occupies its "reverse" position, the reverser valve handle 51 is thrown to the "forward" position to effect the pneumatic communications that are illustrated in Fig. 4. Under such conditions, fluid pressure is transmitted from the control reservoir 3 through pipes 85 and 58, passage 59 of the brake valve 5, pipes 55 and 48, passage 49 of the reverser valve, pipe 46, train-line pipe 9 and pipe 86 to the operating cylinder of the main reverser 10, which is thus thrown to its "forward" position. As previously mentioned, the reverser is preferably electrically interlocked with the drum controller 1 or a line switch to prevent actuation of the reverser unless the control drum 1 occupies its "off" position, corresponding to disconnection of the motors from the supply circuit.

At the same time, fluid pressure is admitted to pipe 87 and thence through the transfer valve 11, as already described, to pipe 76 and the triple valve, whereby the desired release of the brakes is effected.

The opposite action of the reverser valve, entailing a substitution of pipes 88 and 89 for pipes 86 and 87, respectively, will be understood without detailed description.

The master controller valve 6 may then be actuated to its "series" position, whereby fluid pressure is transmitted from the supply pipe 37 through passage 41 in the valve to pipe 38. The pressure in pipe 38 is decreased to a predetermined value by means of the pressure reducer 7, and such decreased fluid pressure is transmitted through pipes 90 and 47, through the reverser valve, pipes 46, 9 and 87 and through the transfer valve as previously traced, to the pipe 74. The pneumatic operating medium is further carried through the time-limit valve 13 or the check valve 14 to pipes 34 and 33. The application of fluid pressure to the series cylinder 31 causes the piston 29 to move toward the right and correspondingly actuate the rack member 21, which gradually rotates the control drum 1 into its "series" position. The diminished pressure in the pipe 34, although transmitted through pipe 33ª to the parallel cylinder 32, is insufficient to actuate the associated piston 30 and, consequently, the lever arm 26 is actuated by the piston 29 around the lost-motion connection 28 as a fulcrum. The size of the series cylinder 31, together with the mechanical advantage of the system of levers illustrated, is sufficient to overcome the constant opposing force of control reservoir pressure in the off cylinder 23, as will be understood.

The drum controller 1 is arrested in its "series" position, and no further actuation thereof can be effected until the master controller valve is actuated to its "parallel" position, which effects connection between the supply pipe 37 and the pipe 36 by means of the internal passage 41 of the valve. In this way, the pressure reducer 7 is by-passed and full control-reservoir pressure is applied to the pipe 90. Such full pressure is, therefore, transmitted to the parallel cylinder 32 through the pneumatic circuit previously traced, and the piston 30 is thus actuated toward the right to effect movement of the drum controller 1 from its "series" to its "parallel" or final position. In this case again, the proportion of parts of the parallel cylinder 32, together with the mechanical advantage arising from the transmission mechanism employed, causes the device to be adapted to overcome the opposing force exerted on the piston 22 of the off cylinder by the control-reservoir pressure.

As previously mentioned, the rate of movement of the drum controller 1 is primarily dependent upon the action of the time-limit valve 13 and, therefore, upon the current traversing the driving motors, although the check valve 14 is, at all times, active to insure that the complete accelerating operation, up to the full series or full parallel condition of the motors, is effected within a predetermined time period.

To return the drum controller 1 to its "off" position, under normal conditions, the master controller is returned to its "off" position, whereby fluid-pressure is exhausted from the series and parallel cylinders through the master controller valve and pipe 39 to the atmosphere. The constantly-applied differential pressure in the off cylinder 23 thereupon positively actuates the drum controller 1 to its "off" position.

The "hold" position of the master controller permits the car or train to be operated at any speed other than that corresponding to full series or full parallel relation of the motors, since the occupation of this position by the master controller valve neither admits nor exhausts air from the system, but merely maintains whatever fluid-pressure conditions are present in the operating system at the time.

The various safety features embodied in the present control system may be set forth as follows. A rupture of the train-line pipes 8 or 9 causes the controller drum 1 to return to the "off" position and also the application of the air-brake or, at least, the actuation of the drum to its "off" position. Assuming, for instance, that the train-line pipe 8 acts as the control pipe and undergoes a rupture, then air is exhausted from the series cylinder 31 and the parallel cylinder 32 through the time-limit valve 13 and the check-valve 14 in their open positions, pipe 74, transfer valve 11 and pipes 79 and 89 to the break in the control pipe 8. Consequently, the constantly-applied differential pressure in the off cylinder 23 rapidly returns the control drum 1 to the illustrated "off" position.

If the train-line pipe 9, when acting as the brake pipe, is ruptured, as soon as the master controller is returned to its "off" position the air or other fluid-pressure medium will be exhausted from the operating cylinders 31 and 32 through the transfer valve 11 to control pipe 8 and thence through pipes 45, 47, 90, 36 and 39 to the atmosphere. Furthermore, the decrease in pressure in the brake pipe 9 effects the reduction of pressure in the pipes 87, 80 and 76, whereby the triple valve is actuated to set the vehicle brakes.

Actuation of the brake valve handle 60 to the emergency position, when the master controller valve 6 occupies its parallel position, causes the drum 1 to return to the "off" position and also effects an application of the air-brakes. The actuation of the control drum 1 arises from the fact that, under such conditions, the delivery pipe 90 exhausts air from the parallel pipe 36 through emergency pipe 57 and exhaust pipe 56 of the brake valve, thus allowing the pressure in the actuating cylinders 31 and 32 to be released.

Furthermore, the direct release of air from the control reservoir through pipes 58, 57 and 56 causes a reduction of pressure in the system sufficient to effect the actuation of the triple valve and, therefore, the application of the vehicle brakes.

If the reverser valve handle 51 is thrown when the master controller valve 6 occupies its "parallel" position, the main reverser 10 is not actuated since, under such conditions, the fluid pressure which already obtains in the one or the other of the train-line pipes 8 and 9 is then balanced by the application of equal pressure to the other train-line pipe, thus preventing any movement of the main reverser 10 by reason of balanced pressures in the opposing cylinders thereof. This protective feature is provided in addition to any electrical interlocking that may be employed.

The positive-return property of the drum controller 1 has already been set forth and is an important safety feature of the present invention.

If a straight air braking system is desired, rather than the automatic system indicated, employing the triple valve, such a system may be readily devised from the present system by merely permanently joining pipes 55 and 58 of the brake valve 5, plugging the pipe leading to the triple valve and employing an additional braking train-line pipe for effecting direct communication with the various brake cylinders.

I do not wish to be restricted to the specific structural details or arrangement of parts herein set forth, as various modifications thereof may be made without departing from the spirit and scope of my invention. I desire, therefore, that only such limitations shall be imposed as are indicated in the appended claims.

I claim as my invention:

1. A control system comprising a circuit-governing member having a plurality of operative positions, and operating means for said member having a plurality of successive and unlike differential effects corresponding to the respective positions.

2. A control system comprising a circuit-governing member having a plurality of operative positions, and operating means for said member for producing a plurality of unlike differential effects in succession to carry said member to its respective positions.

3. A control system comprising a circuit-governing member having a plurality of operative positions, and operating means for said member having a plurality of members two of which act in succession differentially to a third.

4. A control system comprising a circuit-governing member having a plurality of operative positions, and operating means for said member having a plurality of successive and unlike differential fluid-pressure effects corresponding to the respective positions.

5. A control system comprising a circuit-governing member having a plurality of operative positions, and operating means for said member for producing a plurality of unlike differential fluid-pressure effects in succession to carry said member to its respective positions.

6. A control system comprising a circuit-governing member having a plurality of operative positions, and operating means for said member having a plurality of fluid-pressure members two of which act in succession differentially to a third.

7. A control system comprising a circuit-governing member having a plurality of operative positions, and operating means for said member comprising a power-operated member, a transversely-extending lever associated therewith at an intermediate point, and a plurality of power-operated members connected to the ends of said lever.

8. A control system comprising a circuit-governing member having a plurality of operative positions, and operating means for said member comprising a power-operated member, a transversely-extending lever associated therewith, and a plurality of unlike power-operated members connected to the ends of said lever.

9. A control system comprising a circuit-governing member having a plurality of operative positions, and operating means for said member comprising a fluid-pressure-operated member, a transversely-extending lever associated therewith, and a plurality of unlike fluid-pressure-operated members connected to the ends of said lever.

10. A motor-control system comprising a circuit-governing member having positions corresponding to series and to parallel motor operation, of operating means for said member comprising a piston biased by fluid-pressure toward a predetermined position, a transversely-extending lever secured to the piston rod, and a plurality of differently-sized pistons connected to the ends of said lever and adapted to be operated in succession to actuate the circuit-governing member to its series and to its parallel position, respectively.

11. A control system comprising a circuit-governing member having a plurality of operative positions, fluid-pressure operating means for said member, means for admitting different pressures to said operating means to exert successive differential effects and actuate said member to its successive positions.

12. A control system comprising a circuit-governing member having a plurality of operative positions, fluid-pressure operating means for said member having a plurality of elements adapted to act differentially to a third, and means for effecting movement of one element or of both elements, whereby said member is actuated to one operative position or is temporarily held there and then carried to another operative position.

13. A control system comprising a circuit-governing member having a plurality of operative positions, fluid-pressure operating means for said member, a braking system, two train-line pipes respectively corresponding to said member and to said braking system, and means for maintaining a constant fluid pressure in one portion of said operating means, whereby a rupture of a train-line pipe effects the release of fluid-pressure from another portion of said operating means to permit said constant pressure to actuate said member to a predetermined position.

14. A control system comprising a drum controller having an "off" and a plurality of operative positions, differential fluid-pressure operating means for said controller, a braking system, two train-line pipes respectively corresponding to said controller and said braking system, and means for maintaining a constant fluid-pressure in one end of said operating means, whereby a rupture of a train-line pipe effects the release of fluid-pressure from the other end of said operating means to permit said constant pressure to return said controller to its "off" position.

15. A pneumatic control system comprising an electric-circuit-governing member and a braking system, a plurality of train-line pipes, and means for interchanging the governing functions of said pipes with respect to said member and said braking system.

16. A pneumatic control system comprising an electric-circuit-governing member and a braking system, two train-line pipes and means including a transfer valve for interchanging the operating effects of said pipes with respect to said member and said braking system.

17. A pneumatic control system comprising an electric-circuit-governing member and a braking system, two train-line pipes, two delivery pipes respectively corresponding to said member and said braking system, and a transfer valve interposed between said train-line pipes and said delivery pipes for interchanging the communications therebetween.

18. A pneumatic motor-control system comprising an electric-circuit-governing member and a braking system, a plurality of train-line pipes, and means for interchanging the governing functions of said pipes with respect to said member and said braking system, said pipes also corresponding to forward and reversed operation of the motors.

19. A pneumatic control system comprising an electric-circuit-governing member and a braking system, two train-line pipes, two delivery pipes respectively corresponding to said member and said braking system, a transfer valve interposed between said train-line pipes and said delivery pipes, a pneumatic motor-reverser, and a valve device for concurrently effecting forward or reverse operation of said motor-reverser and a movement of said transfer valve to interchange the communications between the train-line pipes and the delivery pipes.

20. A control system comprising a circuit-governing member, fluid-pressure-operated means for actuating said member, manual means for primarily governing the supply of fluid-pressure to said actuating means, means responsive to predetermined operating conditions for automatically and intermittently interrupting said supply, and means independent of said responsive means for insuring a given rate of supply.

21. A control system for dynamo-electric machines comprising a rotatable circuit-governing member, fluid-pressure-operated means for actuating said member, manual means for primarily governing the supply of fluid to said actuating means, valve means responsive to predetermined machine-current conditions for directly interrupting said supply, and a check-valve by-passing said valve means to insure complete movement of said circuit-governing member in a given time interval.

22. A control system comprising a circuit-governing member, fluid-pressure-operated means for actuating said member, manual multi-position means for primarily governing the supply of fluid-pressure to said actuating means, and brake-controlling means adapted, when occupying a certain position and when said multi-position means occupies a predetermined position, to effect the actuation of said fluid-pressure-operated means.

23. A control system comprising a circuit-governing member, fluid-pressure-operated means for actuating said member, a multi-position controller valve for primarily governing the supply of fluid-pressure to said actuating means, and a brake valve adapted, when occupying its emergency position and when the controller valve occupies its "full on" position, to effect the release of pressure from said actuating means to permit a return thereof to the "off" position.

24. A control system comprising a circuit-governing member, fluid-pressure-operated actuating means therefor, a multi-position controller valve for primarily governing the supply of fluid-pressure to said actuating means, two train-line pipes assisting to connect said valve with said actuating means, a pneumatic reverser having its opposing cylinders connected to the respective train-line pipes, and a reverser valve for normally admitting fluid-pressure to the one or the other train-line pipe and corresponding cylinder, control of the pneumatic reverser by the reverser valve being prevented when the controller valve occupies a certain position because of the balancing of pressures in said train-line pipes and in said opposing cylinders.

In testimony whereof, I have hereunto subscribed my name this 2nd day of Oct., 1919.

B. O. AUSTIN.